Sept. 12, 1950 G. W. McHENRY 2,522,186
COMBINATION CUSHION AND SUPPORT PAD
Filed Dec. 31, 1946 2 Sheets-Sheet 1
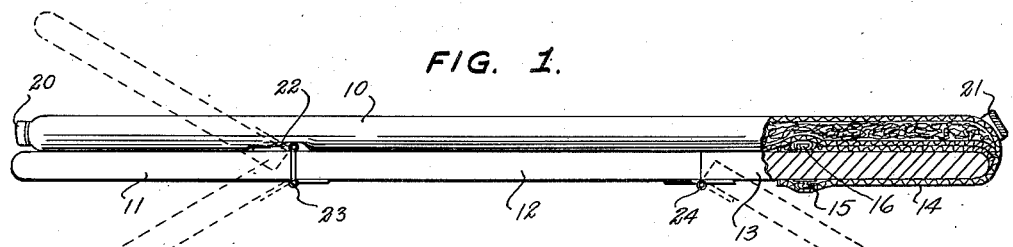
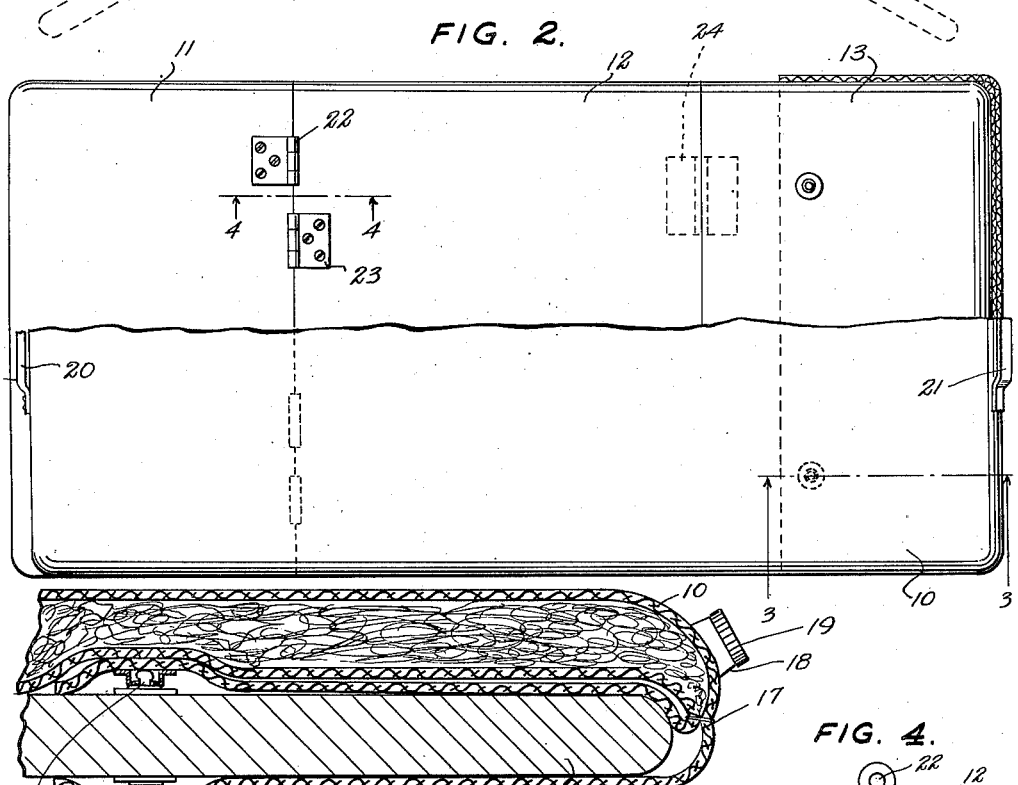
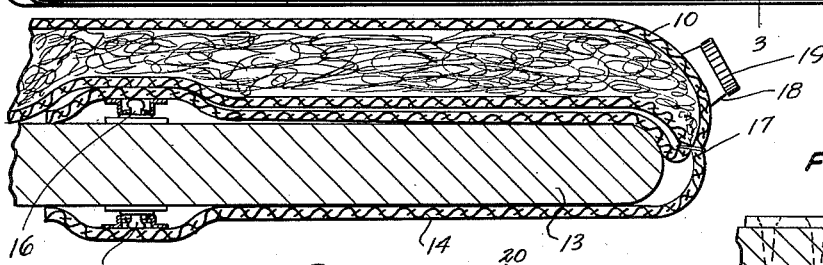
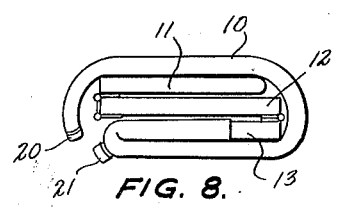
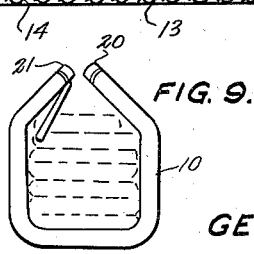
Inventor
GEORGE W. McHENRY, Sept. 12, 1950  G. W. McHENRY  2,522,186
COMBINATION CUSHION AND SUPPORT PAD
Filed Dec. 31, 1946  2 Sheets-Sheet 2
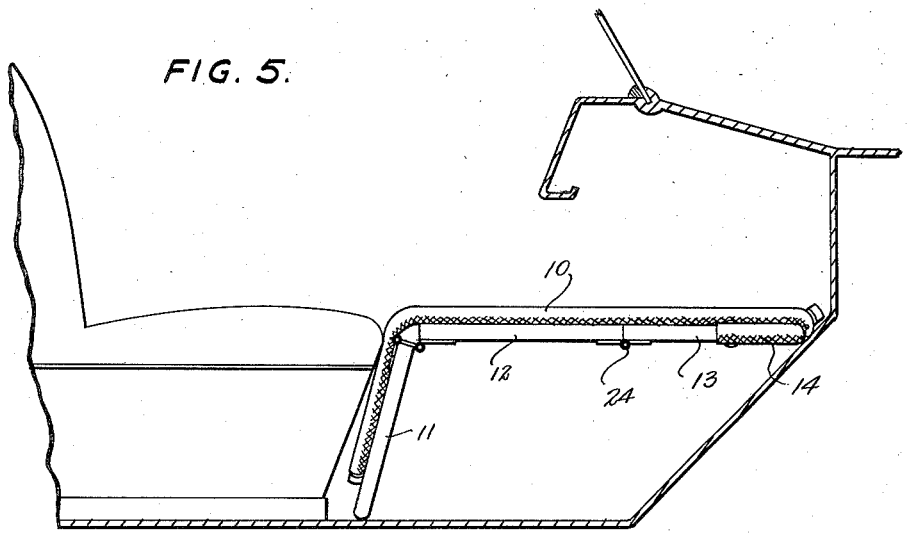
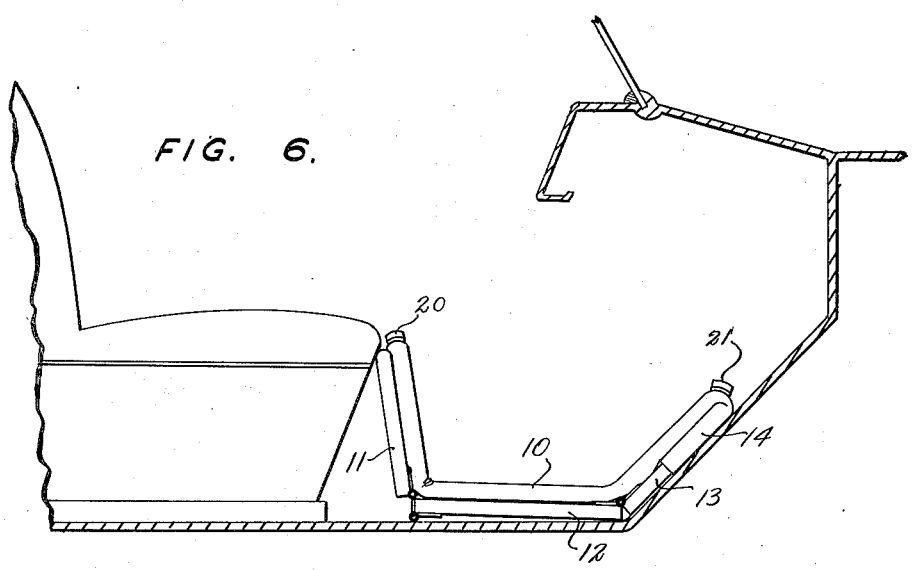
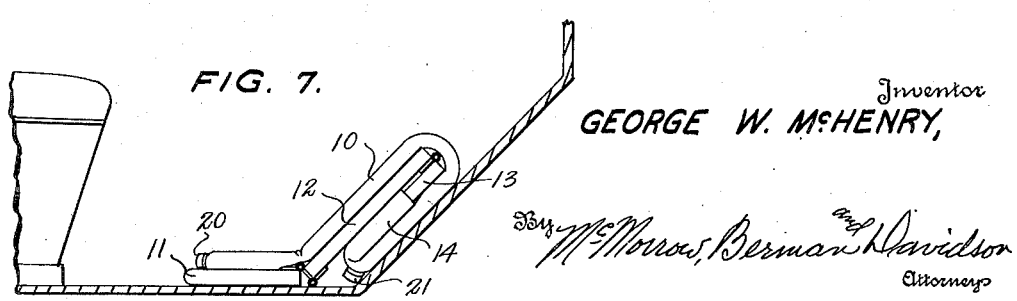
GEORGE W. McHENRY, Inventor Patented Sept. 12, 1950

2,522,186

UNITED STATES PATENT OFFICE 2,522,186

COMBINATION CUSHION AND SUPPORT PAD

George W. McHenry, Pomona, Calif.

Application December 31, 1946, Serial No. 719,529

5 Claims. (Cl. 155—165)

1

This invention relates to folding pads and foot rests for motor vehicles and in particular the combination of a plurality of folding elements with an elongated bag adapted to carry blankets, raincoats, and the like, as a filling therefor, and which may be folded to form a back rest on the seat, seat elevating means, or a leg or foot rest, or the device may be removed and used as a cushion for football games and the like.

Folding cushions have been provided for porch seats and swings, cots, beach mats, and the like, but these do not include partially rigid elements adapted to support the pads for foot rests and the like, and the cushions are not adapted for holding blankets, raincoats, and the like. With these thoughts in mind this invention contemplates the combination with a plurality of folding panels, a long bag with one end closed by snap fasteners or the like, in which articles that may be used on a trip, or at a game, picnic or the like, may be stored and readily carried.

The purpose of the invention is to provide a folding combination pad in which the elements thereof may be carried in one hand by handles at the ends thereof which contains cushioning and supporting elements so that it may be used on the floor of a motor vehicle to accommodate persons with comparatively short legs, or used on the seat to raise the elevation thereof for children, or used as a back rest, or used independently as a cushion.

For some uses, particularly for a person with an injured limb, it is desirable to bridge over the space in front of a seat of a motor vehicle in order to support the limb with comfort and for this reason the invention includes a folding pad having hinged elements adapted to fold in one direction, which will not fold in an inverted position so that the elements may be positioned to form a support or bridge.

The object of the invention is, therefore, to provide a combination pad having rigid and cushion elements which may be folded to various positions and used for various purposes in combination with a motor vehicle.

Another object is to provide a foldable portable cushion and supporting device which is also adapted to contain articles such as blankets, raincoats and the like.

Another object of the invention is to provide supporting means in a folding cushion so that it may be used in an emergency to support an injured limb in a motor vehicle or as a back rest at a game or on a beach or the like.

A further object of the invention is to provide

2 a folding supporting cushion for use in motor vehicles and the like which is of a simple and economical construction.

With these and other objects in view the invention embodies, a plurality of hinged panels, and an elongated bag having cushioning elements therein, in which the cushioning elements may be removable and adapted for use independent of the device, and the bag is removably attached to the panels.

Other features and advantages of the invention will appear from the following description taken in connection with the drawings, wherein:

Figure 1 is a view showing a side elevation of the combination pad with parts broken away showing sections through the elements, and parts indicated in dotted lines in their partly folded positions.

Figure 2 is a plan view of the pad with parts broken away and parts in section in which the lower portion shows the upper cushion pad and the upper portion shows the lower hinged pad.

Figure 3 is a cross section on line 3—3 of Figure 2 showing an enlarged section through the ends of the pads with the thickness of the covering material exaggerated.

Figure 4 is a detail showing a section through the double hinge joint between two of the panels of the folding pad.

Figure 5 indicates a section through a portion of a motor vehicle associated with the front seat thereof, with parts broken away and parts omitted, showing the pad used as a supporting element in combination with the seat.

Figure 6 is a similar view showing the pad positioned on the floor of the vehicle and also associated with the front seat.

Figure 7 is a similar view showing the pad folded on the floor of the vehicle.

Figure 8 is a view showing the complete pad folded as it may be used to elevate a seat of a motor vehicle for children or as a foot rest.

Figure 9 is a view showing the pad folded in a position for carrying by hand.

Referring now to the drawings wherein like reference characters indicate corresponding parts the combination folding pad of this invention includes a cushion pad 10 and a folding pad having a center panel 12 and end panels 11 and 13, and an open end 14 of the cushion pad 10 is folded back and engages about the end of the panel 13 and is removably attached thereto by snaps 15 and 16 as shown in Figure 3.

The cushion pad 10 is formed with a continuous bag of canvas, rayon or the like, and the end may be open so that blankets, raincoats, and the like may be placed therein, or it may be filled with suitable filling material and stitched across at the point 17 shown in Figure 3, and the filled portion may also be provided with a filling nipple 18 having a removable cap 19. The ends of the pad 10 are provided with handles 20 and 21 by which it may be carried as shown in Figure 9.

The folding pad is formed in sections as indicated by the numerals 11, 12, and 13, and the sections may be formed of soft, rigid, or partially rigid or bendable material as may be desired. The sections or panels 11 and 12 are joined by hinges 22 and 23 wherein they may bend or fold in either direction and the panels 12 and 13 are joined by hinges 24 which permit bending or folding in one direction only. In the extended position of the panels the edge of the outer panel 13 will abut the adjacent edge of the center panel 12 for limiting the hinged movement between the panels. The hinges 24 provide means for holding the panels 12 and 13 upward to form a bridge as shown in Figure 5 so that it may be used to support a limb in an outright position in case of a fracture or injury.

It will therefore be noted that with this combination of cushioning and supporting pads the device may be used in various positions and for various purposes, and is particularly useful for increasing the riding comfort of passengers in motor vehicles.

The hinges and other elements may be arranged in different positions for different uses and other changes may be made in the design and construction without departing from the spirit of the invention.

What is claimed is:

1. In the combination of a flexible cushion and support therefor, said support comprising a center substantially rigid panel, a pair of end panels, hinges on one side of said center panel connecting one end panel thereto for folding over one side of said center panel, hinges on both sides of the opposite edge of said center panel connected to one edge of the other end panel for folding said latter end panel over each side of said center panel selectively, and means securing said flexible cushion on one of said end panels.

2. The combination with a flexible cushion of a folding pad disposed in abutting relation with respect to said cushion and secured thereto, said folding pad comprising a center panel, a first end panel disposed in end to end relation with respect to one end of said center panel and mounted on the latter for swinging movement toward and away from one side of said center panel, and a second end panel disposed in end to end relation with respect to the other end of said center panel and mounted on the latter for swinging movement toward and away from either of the sides of said center panel.

3. The combination with a flexible cushion of a folding pad disposed in abutting relation with respect to said flexible cushion, said folding pad comprising a center panel, a first end panel disposed in end to end relation with respect to one end of said center panel and mounted on the latter for swinging movement toward and away from one side of said center panel, a second end panel disposed in end to end relation with respect to the other end of said center panel and mounted on the latter for swinging movement toward and away from either of the sides of said center panel, and means carried by said flexible cushion and engageable with said first end panel for detachably securing said cushion and folding pad together.

4. A support comprising a hollow cushion pad having one end open for the insertion therethrough of various articles of clothing to be supported within said cushion pad, and a folding pad disposed in abutting relation with respect to said cushion and secured thereto, said folding pad comprising a center panel, a first end panel disposed in end to end relation with respect to one end of said center panel and mounted on the latter for swinging movement toward and away from one side of said center panel, and a second end panel disposed in end to end relation with respect to the other end of said center panel and mounted on the latter for swinging movement toward and away from either of the sides of said center panel.

5. A support comprising a hollow cushion pad and a folding pad having one side face disposed in abutting relation with respect to said cushion and secured thereto, said folding pad comprising a center panel, a first end panel disposed in end to end relation with respect to one end of said center panel and mounted on the latter for swinging movement toward and away from the abutting side of said center panel, and a second end panel disposed in end to end relation with respect to the other end of said center panel and mounted on the latter for swinging movement toward and away from the abutting and non-abutting sides of said center panel.

GEORGE W. McHENRY.

REFERENCES CITED

The following references are of record in the file of this patent:

UNITED STATES PATENTS

| Number | Name | Date |
|---|---|---|
| 78,304 | Martin | May 26, 1863 |
| 244,529 | Beggs | July 19, 1881 |
| 866,316 | Watson | Sept. 17, 1907 |
| 1,297,537 | Brungard | Mar. 18, 1919 |
| 1,891,747 | Clements | Dec. 20, 1932 |
| 1,925,358 | Wittcoff | Sept. 5, 1933 |

FOREIGN PATENTS

| Number | Country | Date |
|---|---|---|
| 191,650 | Great Britain | Jan. 18, 1923 |